C. R. Gardner.
Swaging Screws.

Nº 15,512. Patented Aug. 12, 1856.

UNITED STATES PATENT OFFICE.

CHARLES R. GARDNER, OF DETROIT, MICHIGAN.

IMPROVEMENT IN DIES FOR SCREW-BLANKS.

Specification forming part of Letters Patent No. 15,512, dated August 12, 1856.

*To all whom it may concern:*

Be it known that I, CHARLES R. GARDNER, of Detroit, in the county of Wayne and State of Michigan, have invented new and useful Dies for Pointing and for Forming the Threads of Gimlet-Pointed Screws; and I do hereby declare that the following is a full, clear, and exact description of the construction and operation of the same, reference being had to the annexed drawings, making a part of this specification, in which—

Figure 1:
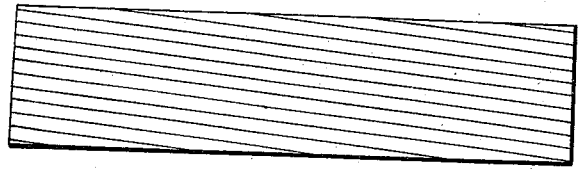
Figure 2:
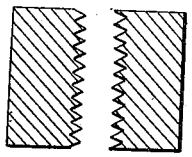
Figure 3:
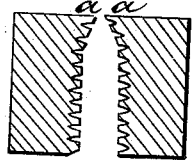
Figure 4:
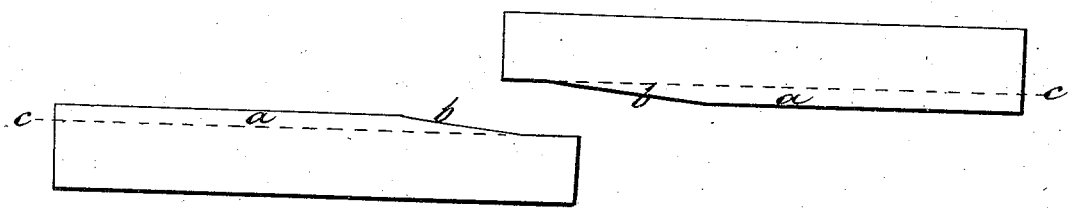

Figure 1 represents the face of a die, two of which are required, the oblique parallel lines showing the direction of the grooves in the face of the dies for forming the thread. Figs. 2 and 3 are transverse sections of pairs of dies face to face in working position, Fig. 2 showing dies for forming a V-thread upon straight unpointed screws, and Fig. 3 showing a section of dies for threading gimlet-pointed screws, the point being threaded by the elevations marked $a\ a$ at the same time the body of the screw is threaded by the remaining portions of the dies. Fig. 4 represents the side of the dies marked $a\ a$ in Fig. 3, showing the elevation $a\ a$ to be cut away or sloped off at one end of the dies $b\ b$ down to the level of that part of the die for threading the body of the screw represented by the lines $c\ c$.

The dies may be made of steel and hardened or of iron and case-hardened. The grooves may be planed out or formed with a revolving cutter. Said grooves should be parallel with each other and of the same depth and distance apart, as it is intended with them to form the threads of screws. The grooves should form the same angle with the sides of the die or the plane in which the movable die moves, as the thread of the screw to be formed on the die would form with a plane cutting the axis of the screw at right angles. The two dies are alike and the faces previous to being grooved may be planes, except for dies for making pointed screws, which require the elevation $a$. The breadth of the faces of each of the dies should be as great as the length of the screw to be formed by them, as the blank to be threaded is placed transversely across them for the operation of threading. The length of the dies may vary from twice the circumference of the blank up to such a length as would be sufficient to form a full thread upon by rolling the blank once the length of the dies, which for forming ordinary screws upon hot blanks would not, I think, vary much from twenty inches, but differing according to the depth of the thread, the circumference of the blank, and the ease with which the material receives the impression. The grooved faces of the dies are facing each other and parallel, or nearly so. The blank to be threaded is placed between and transversely across the faces of the dies, and then the dies are brought so near together as to cause them both to bear against the blank, when one of the dies should have a longitudinal motion, during which the faces should gradually be brought closer, so as to bear sufficiently against the blank to cause the material thereof to fill the grooves of that portion of the dies against which it lies.

The dies may be actuated in any convenient way. I consider as simple a way is to use dies of such length that the thread may be formed by running the blank once over their length, in which case one die may be fixed and the other run in guides in a plane sufficiently inclined to the length of the face of the fixed die to cause the movable one to approach the other sufficiently to impress a full thread upon a blank between the dies. Shorter dies may be used giving a reciprocating motion to the movable one. The blank may be conveniently introduced between the ends $b\ b$ of the dies when in the position shown at Fig. 4. The slope $b$ is for forming the taper on the point of the blank for pointed screws, combining the pointing and threading in one operation. The dies operate by bearing so hard against the blank as to form their impression upon it while it is being rolled by the longitudinal motion of one of the dies, thus presenting the whole circumference of the blank to the action of the dies, and this action is repeated or continued until a full impression is formed. The pressure upon the blank should not be so great as to flatten the blank, and thus prevent it from rolling, but should be made slowly and gradually as the rolling proceeds.

What I claim as my invention, and desire to secure by Letters Patent, is—

The elevation $a$ and the slope $b$, each substantially as described, and for the purposes herein specified.

CHAS. R. GARDNER.

Witnesses:
ALVIN S. HIGGINS,
E. E. CLARK.